Aug. 25, 1959 W. M. BARRET 2,901,688
METHOD OF EXPLORING THE EARTH WITH ELECTROMAGNETIC ENERGY
Filed Feb. 10, 1954 6 Sheets-Sheet 1

Inventor
William M. Barret,
By John B. Brady
Attorney

Aug. 25, 1959 W. M. BARRET 2,901,688
METHOD OF EXPLORING THE EARTH WITH ELECTROMAGNETIC ENERGY
Filed Feb. 10, 1954 6 Sheets-Sheet 2
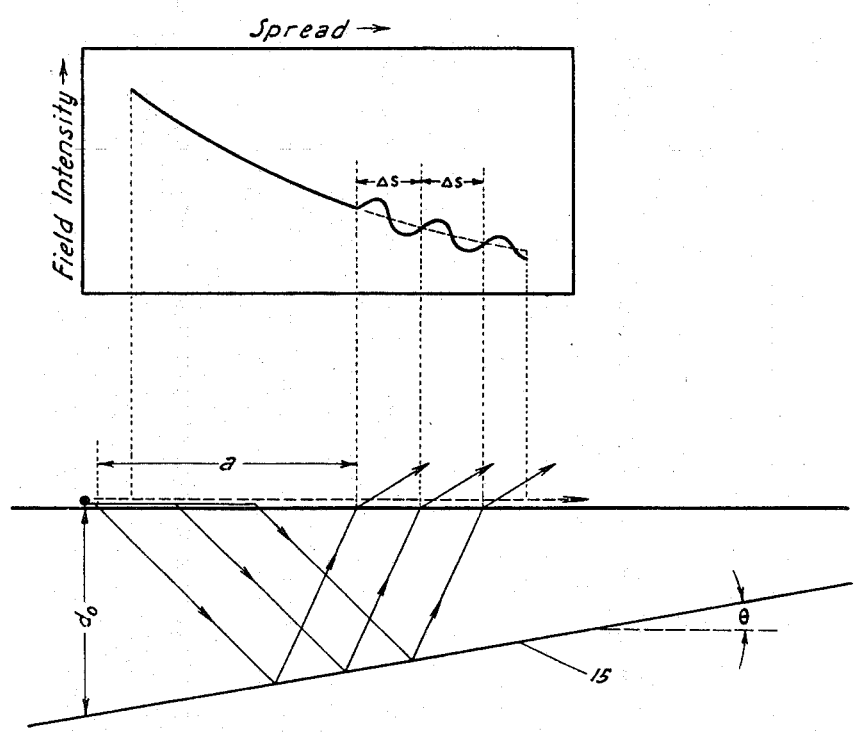
FIG. 5
FIG. 6
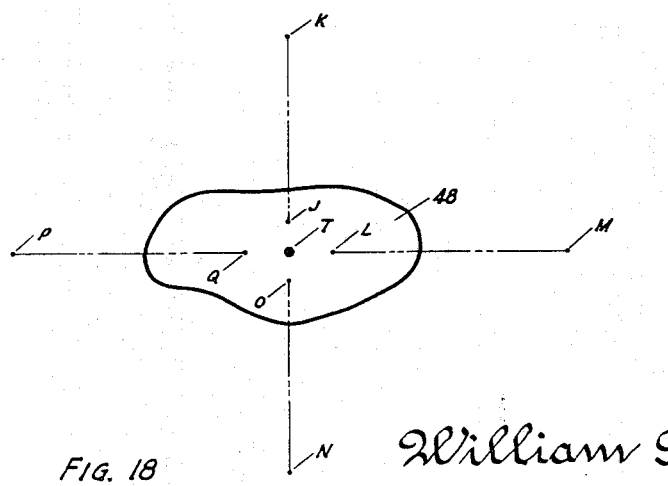
FIG. 18
Inventor
William M. Barret,
By John B Brady
Attorney Aug. 25, 1959 W. M. BARRET 2,901,688
METHOD OF EXPLORING THE EARTH WITH ELECTROMAGNETIC ENERGY
Filed Feb. 10, 1954 6 Sheets-Sheet 3

Aug. 25, 1959 W. M. BARRET 2,901,688
METHOD OF EXPLORING THE EARTH WITH ELECTROMAGNETIC ENERGY
Filed Feb. 10, 1954 6 Sheets-Sheet 4
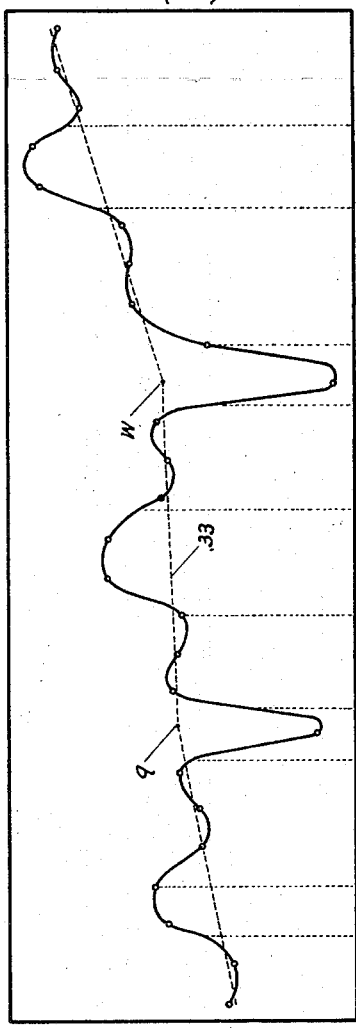
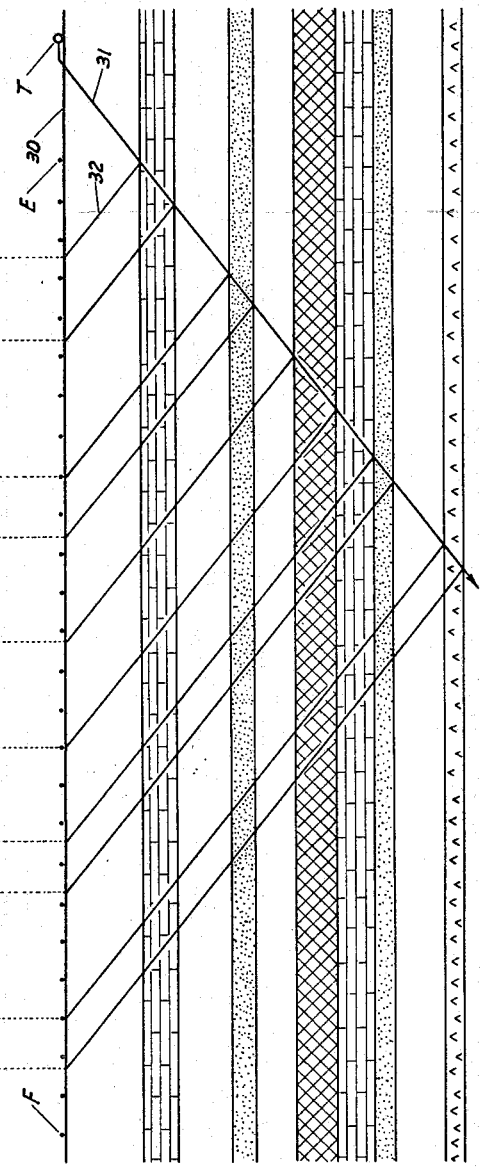
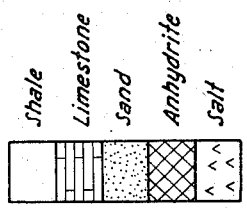
Inventor
William M. Barret,
By John B. Brady
Attorney Aug. 25, 1959   W. M. BARRET   2,901,688
METHOD OF EXPLORING THE EARTH WITH ELECTROMAGNETIC ENERGY
Filed Feb. 10, 1954   6 Sheets-Sheet 5
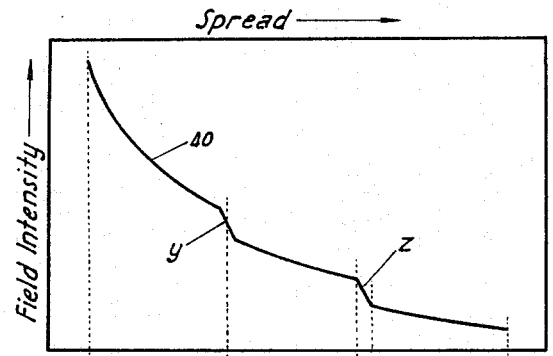
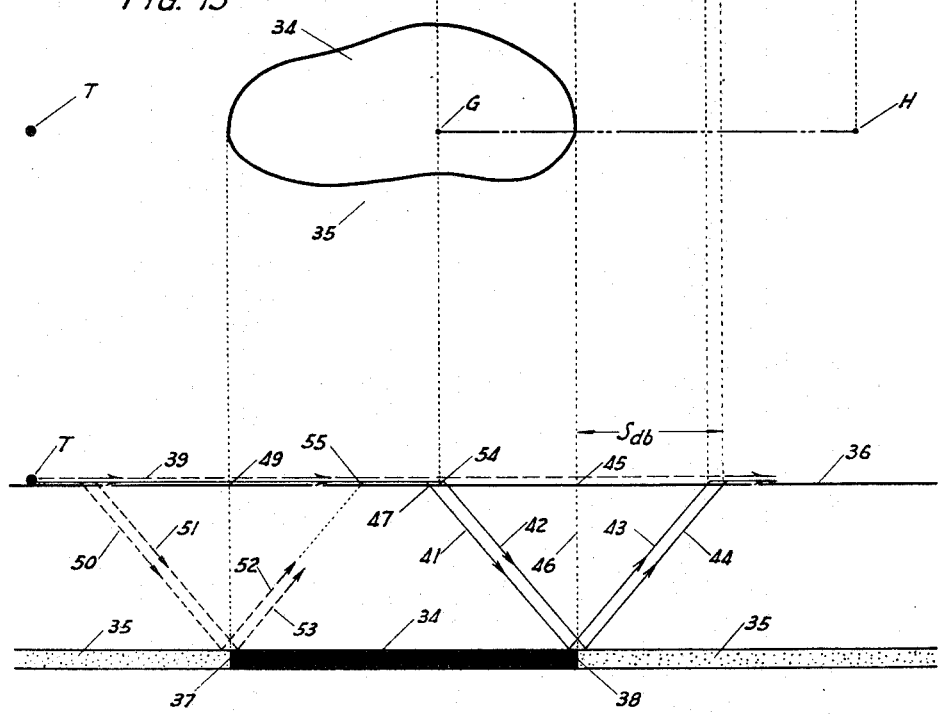
Inventor
William M. Barret,
By John Q. Brady
Attorney Aug. 25, 1959  W. M. BARRET  2,901,688
METHOD OF EXPLORING THE EARTH WITH ELECTROMAGNETIC ENERGY
Filed Feb. 10, 1954  6 Sheets-Sheet 6

Inventor
William M. Barret,
By John B. Brady
Attorney

United States Patent Office 2,901,688
Patented Aug. 25, 1959

2,901,688

METHOD OF EXPLORING THE EARTH WITH ELECTROMAGNETIC ENERGY

William M. Barret, Shreveport, La., assignor to Engineering Research Corporation, Shreveport, La., a corporation of Louisiana Application February 10, 1954, Serial No. 409,485

22 Claims. (Cl. 324—6)

This invention relates generally to the art of electrical prospecting, and particularly to an improved method of utilizing electromagnetic energy to explore the earth and thereby disclose useful subsurface information.

This application is a continuation-in-part of my copending application, Serial No. 85,418, filed April 4, 1949, which was co-pending with the parent application, Serial No. 516,559, filed December 31, 1943, for Method of Exploring the Earth with Electromagnetic Energy.

Broadly speaking, the principal objects of the invention are to provide a novel and effective technique of determining, from measurements preferably conducted at or near the earth's surface: (1) the presence, location, extent, depth and character of various types of electrical discontinuities that occur in the geologic section, and (2) certain important electrical properties of the geologic section, and of particular subsurface formations and zones.

The functioning of the invention is postulated on the detection of contrasts that exist between the refractive indices of the various materials that comprise the earth's lithosphere. Such contrasts may be found at the interfaces between the formations included in the stratigraphic section; at the interfaces between sedimentary media and variousm ineral deposits, and at other forms of what may be termed "horizontal" discontinuities. Similar contrasts may also occur at the peripheral boundary of an oil (distillate or gas) accumulation; at a fault plane, or other formation contact or "pinch out"; at the boundaries between sedimentary materials and discrete masses, such as salt domes, igneous plugs, dikes and veins, and at other kinds of what may be denoted "vertical" discontinuities.

Applicant's co-pending application, Serial No. 383,770, filed March 17, 1941, and entitled "Means and Method of Electromagnetic-Wave Investigations," now Patent No. 2,426,918, issued September 2, 1947, under the title "Method of Electromagnetic-Wave Investigations of Earth Formations," discloses a system of effectively exploring the geologic section with electromagnetic waves whose frequency is varied during a series of observations. Continued research led to the development of notable improvements in the method set forth in the said patent, and it is the purpose of the present application to describe the improved method and claim all novelty inherent in the invention disclosed.

The method set forth in the present application performs its useful functions through the agency of electromagnetic waves whose frequency preferably remains susbtantially constant during a series of observations. Furthermore, the spread (or distance) between the transmitting and receiving means embodied in the patented method is kept fixed throughout a set of measurements, whereas the said spread is varied in the operation of the instant invention.

The concept of variable frequency and constant spread, which is fundamental to the earlier invention, is completely reversed in the case of the method described in the present application, so that its operation is predicated on the concept of constant frequency and variable spread. These significant modifications lead to the improved method disclosed herein, and referred to more particularly in what follows.

When a source of constant-frequency electromagnetic waves, such as a radio transmitter, is placed in operation on the surface of the earth, and field-intensity measurements are made with a receiver along a line extending away from the transmitter, it is found that the reading of the receiver will, in general, decline progressively as the distance to the transmitter increases. It is the conventional belief that the decrease in field intensity is due to the spherical character of the waves involved and to the attenuation caused by eddy-current losses in the partially conducting earth.

The attenuation arising from absorption is thought to be restricted to shallow earth media, for it is the general opinion among geophysicists and radio engineers that electromagnetic waves of moderate and high frequencies penetrate but a comparatively short distance into the earth. Illustrative of the belief that waves whose frequencies lie well into and above the audio spectrum do not penetrate the earth more than a very few hundred feet are the following references taken from accepted textbooks: C. A. Heiland, "Geophysical Exploration," pp. 809–812, Prentice-Hall, Inc., New York (1940); J. J. Jakosky, "Exploration Geophysics," p. 9, pp. 394–395, Times-Mirror Press, Los Angeles (1940); L. L. Nettleton, "Geophysical Prospecting for Oil," pp. 380–381, McGraw-Hill Book Co., Inc., New York (1940). The same belief is indicated in one of the most recent papers on the subject: D. Silverman and D. Sheffet, "Note on the Transmission of Radio Waves Through the Earth," which appeared in the October, 1942, issue of the publication "Geophysics," copies of which may be obtained from the business manager of the Society of Exploration Geophysicists, Menasha, Wisconsin. A volume of corroborative opinion can be found in the radio art.

In contrast with these opinions, it is proposed to demonstrate that the present invention provides a method of transmitting radio waves to considerable depths in the earth; a method of receiving the said waves on their return to the earth's surface after being reflected and refracted at various lithologic boundaries, and a method of utilizing the data acquired thereby to disclose information that is of great technical and economic importance in geologic and geophysical investigations of the earth.

Returning to a consideration of the functional relation between the field intensity and the distance from a wave source, Austin and Cohen of the United States Bureau of Standards have developed an empirical equation which states that:

$$E = \frac{a}{xe^{-kx}} \tag{1}$$

$$\log (Ex) = \log a - kx \tag{2}$$

where E is the electric field strength (or field intensity), $a$ is a constant determined by the frequency and instrumental values, $x$ is the distance between the transmitter and receiver, $e$ is the base of natural logarithms and $k$ is the attenuation factor.

A test of the validity of the Austin and Cohen formula for a given set of data can be made by plotting $x$ against $\log (Ex)$, which should give a straight line when the formula fits the data, the slope of the line representing the attenuation factor.

According to the teachings of the herein described invention, the x versus log (Ex) curve generally is not a straight line of uniform slope, but displays marked and abrupt changes in gradient and local anomalies of considerable amplitude, neither of which can ordinarily be explained by the sphericity of the waves and/or the absorption due to the surficial medium, that is, the geologic media at and near the surface of the earth.

In contradistinction to the teachings of the prior art, it has been found that the gradient changes and discrete anomalies, which indicate unexpected departures from the Austin and Cohen equation, are caused by the reception of waves that are reflected by subsurface strata having anomalous indices of refraction, and oftentimes lying at considerable depths. It has also been found that the departures of the character referred to can be employed to achieve the previously enumerated objects of the invention, and to disclose other useful subsurface information for which the invention is adapted.

The utility of the invention and its operation will be understood from the description that follows and the accompanying drawings, of which:

Figure 4:
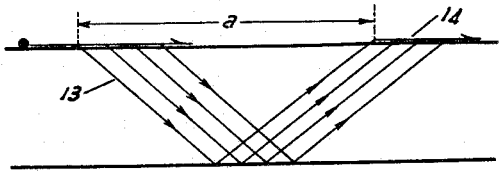

Fig. 4 is a diagrammatic drawing which illustrates the unique wave mechanism employed by the present invention, whereby a radiating means positioned on the earth's surface propagates a surface wave that is progressively refracted into the earth along substantially parallel ray paths, the refracted rays being returned by a subsurface reflector to the said earth's surface, where they combine in like space phase and time phase with the said surface wave.

Fig. 5 is a graph which displays the variation of the field intensity with distance from a wave source located on the earth's surface, and the cyclic departures in field intensity caused by a subsurface reflector that is inclined downward toward the said wave source, as indicated in Fig. 6.

Fig. 6 is a diagrammatic drawing which shows a subsurface reflector that is inclined downward toward a wave source positioned on the earth's surface, and the paths followed by the surface wave and some of the underground rays related thereto.

Figure 7:
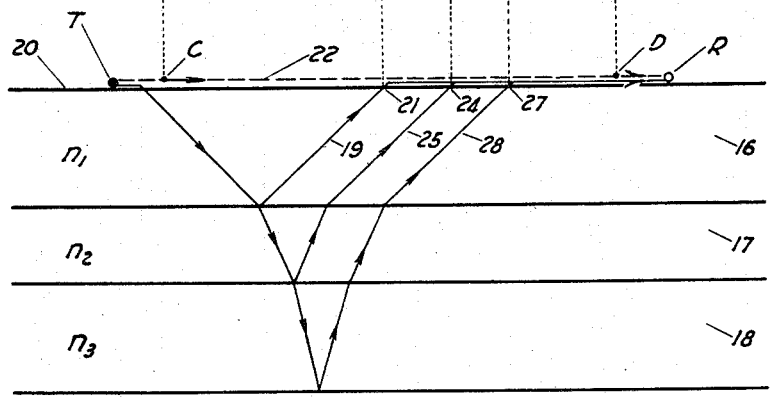

Fig. 7 is a diagrammatic sectional view of a part of the earth that comprises three parallel media whose refractive indices increase with depth, and above which is located a wave source that propagates a surface wave and an underground wave which travel the ray paths indicated.

Figure 8:
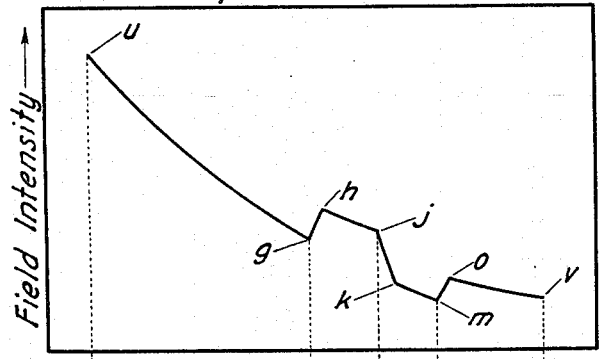

Fig. 8 is a graph which exhibits the variation of the field intensity with distance from a wave source located on the earth's surface, and the anomalies in field intensity caused by the three reflecting surfaces indicated in Fig. 7.

Figures 9, 10, 11:
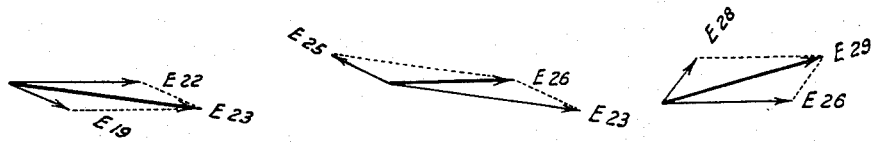

Fig. 9 is a vector diagram which shows the resultant field intensity due to the composition of the field intensity of the surface wave and that of the rays reflected by the interface separating the uppermost and middle media appearing in Fig. 7.

Fig. 10 is a vector diagram which shows the resultant field intensity due to the composition of the resultant of Fig. 9 and the field intensity of the rays reflected by the interface separating the middle and lowermost media appearing in Fig. 7.

Fig. 11 is a vector diagram which shows the resultant field intensity due to the composition of the resultant of Fig. 10 and the field intensity of the rays reflected by the base of the lowermost medium appearing in Fig. 7.

Fig. 12 is a hypothetical cross-section of a part of the earth, on the surface of which is shown a wave source and a series of receiver stations, and some of the ray paths traveled by an electromagnetic wave that is propagated along the said surface, refracted downward into the said earth, and partially reflected at each lithologic boundary.

Fig. 13 is a legend which indicates the character of the geologic formations appearing in Fig. 12.

Fig. 14 is a graph which illustrates the relation between the spread and the logarithm of the product of the spread and the field intensity observed at the various receiver stations of Fig. 12.

Fig. 15 is a plan view of a wave source and a receiver traverse, beneath a part of which appears a buried accumulation of oil.

Fig. 16 is a partial sectional view of the earth which shows the subsurface oil deposit appearing in Fig. 15, and some of the ray paths followed by an electromagnetic wave that is propagated by a wave source positioned on the surface of the said earth.

Fig. 17 is a graph which exhibits the variation of the field intensity with distance from a wave source, and the anomalies in field intensity caused by a boundary of the oil deposit appearing in Fig. 16.

Fig. 18 is a plan view of a buried accumulation of oil, over which is shown a wave source and four receiver traverses radiating therefrom.

Figure 19:
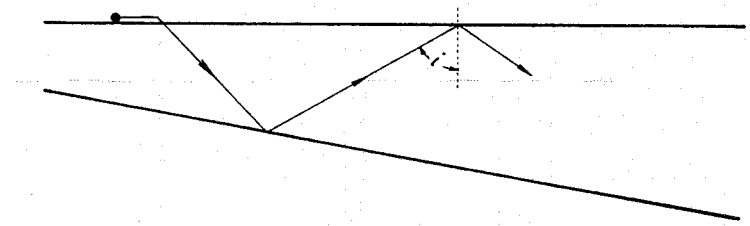

Fig. 19 is a diagrammatic drawing which shows the path of an electromagnetic ray that undergoes total reflection at the earth's surface after being reflected by a subsurface reflector that is inclined upward toward a wave source located on the said surface.

Figure 20:
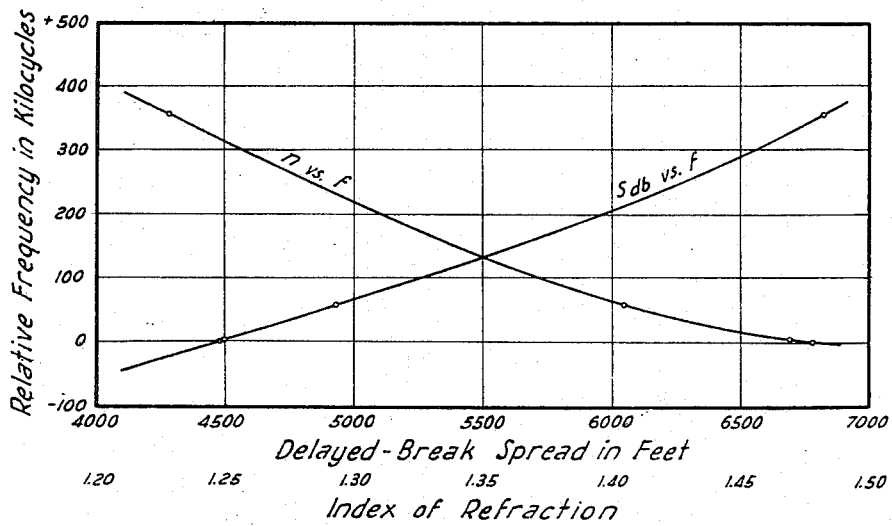

Fig. 20 is a graph which indicates for a particular case the relation between the frequency of the radiation employed and the delayed-break spread, and the relation between the said frequency and the effective refractive index of the earth media involved.

Figures 21, 22:
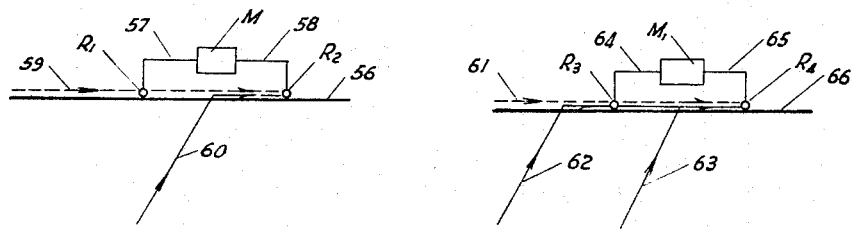

Fig. 21 is a diagrammatic drawing which illustrates two receiving means and an interconnected measuring means positioned on the earth's surface, and the ray paths traveled by a surface wave and an underground wave.

Fig. 22 is a diagrammatic drawing which illustrates two receiving means and an interconnected measuring means positioned on the earth's surface, and the ray paths traveled by a surface wave and two underground waves.

Figure 1:
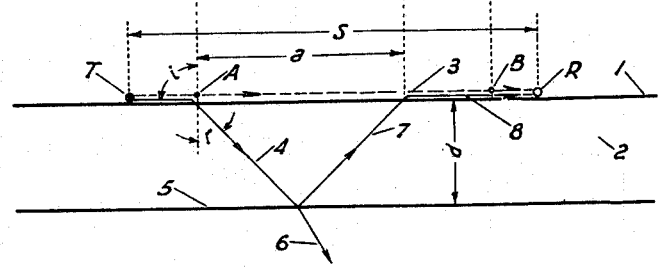
Fig. 1 is a diagrammatic illustration of the ray paths involved in the operation of the invention when it is used to determine the presence and depth of a subsurface reflector.

Concerning the theory of operation of the invention, reference is made to Fig. 1, where a wave source, such as the transmitted T, is positioned on the surface 1 of a plane earth 2 and emits monochromatic electromagnetic waves of wave length λ (in air) substantially along the dashed line 3. Suppose that a receiving means, such as the receiver R, is located on the ground surface 1 as indicated, and that observations of the field intensity may be made with the receiver R along a substantially straight transverse A—B directed toward the transmitter T. As used herein, the term "field intensity" signifies the component of the electric field lying in the vertical plane that includes the point of observation and the radiator associated with the transmitter. It is to be understood, however, that this definition applies only to the preferred mode of operation, for it is known that other components of the electric field, as well as other reference planes, may also be used successfully. Furthermore, it will be appreciated that the measurements may involve a component of the magnetic field instead of a component of the said electric field.

Some of the radiation emitted by the transmitter T will travel in the form of a "surface wave" substantially along the air-earth interface 1, as indicated diagrammatically by the dashed line 3, and some of the said radiation will be refracted into the earth 2 along the line 4. If a reflecting surface, such as the top of a porous formation carrying salt water, were present at 5, and if the reflector 5 where parallel to the earth's surface 1 and at a depth $d$ thereunder, then some of the energy in the ray 4 would be refracted along the line 6 and some would be reflected along the line 7 to the surface 1, and thence refracted along the path 8 to the receiver R.

In the preferred mode of operation the transmitter T and associated radiator are positioned on or near the air-earth interface 1, as hereinafter more fully described, and therefore it may be assumed that no radiation along the line 3 has an angle of incidence on the said interface substantially less than 90 degrees, which means that the said radiation enters the earth 2 at approximately grazing incidence, according to geometric optics. Consequently, when the separation, or spread, between the transmitter T and receiver R is less than the distance $a$, no reflected ray can be detected by the said receiver. The first reflected ray from the buried reflector 5 arrives at R when the spread S is equal to $a$.

It appears in Fig. 1 (and certain succeeding figures) that two waves are propagated to the right by the transmitter T, one the surface wave and the other the wave that is refracted into the earth 2, and also it appears that the refracted wave travels a considerable distance before it enters the said earth. It should be understood, however, that the wave paths are thus defined diagrammatically for the purpose of illustration, for in the preferred mode of operation the said transmitter propagates only a surface wave substantially along the air-earth boundary 1, and the said surface wave is progressively refracted into the said earth as it travels toward the receiver R. The first refracted ray therefore enters the earth at or near the radiator associated with the transmitter T, and successive rays continue to penetrate the earth as the surface wave moves to the right in Fig. 1.

Figure 2:
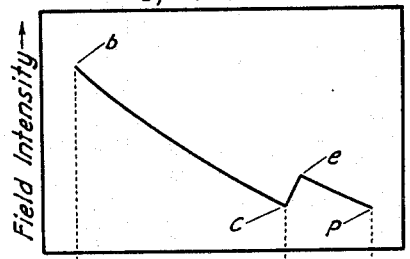
Fig. 2 is a graph which indicates the variation of the field intensity with spread, and the anomaly in field intensity caused by the subsurface reflector shown in Fig. 1.

Suppose, now, that a response curve, or profile, is obtained by either continuous or intermittent operation of the receiver R along the traverse A—B, then a progressive decline in the intensity of the surface wave 3 would be observed as R is moved to the right of the point A, as illustrated by the curve $bc$ of Fig. 2, and when the spread S was equal to the distance $a$, the first reflected ray would be detected by the receiver R, and the profile would indicate a departure from normal, for example, as shown by the break in the curve between $c$ and $e$. As the surface wave leaves the transmitter T, and moves toward the receiver R, rays continue to "peel off" and enter the earth 2 at substantially grazing incidence, as indicated by the ray 4, and at spreads greater than the distance $a$, reflected rays continue to emerge from the said earth and are refracted substantially parallel to the surface 1, as indicated by the ray 8. The time phase and space phase of each emergent ray will be the same with respect to the surface wave 3, and hence there will be a distinct reinforcing action between the emergent rays at the receiver R, where the resultant field intensity is determined by the vector sum of the field intensities of the surface wave and the emergent rays. The amplitude of the said resultant may be more or less than the amplitude of the surface wave, depending on the relative time phase between the surface wave and the emergent rays. In Fig. 2 it is assumed that the components are additive, and that the continuous reinforcement of the surface wave is shown by the upward displacement of the profile from $e$ to $p$.

As the angles of incidence and reflection at the reflector 5 are equal, it is evident from Fig. 1 that:

$$\frac{a}{2d}=\tan r \qquad (3)$$

and since, according to Snell's law, $\sin i/\sin r = n$, where $\sin i$ is the angle of incidence, $\sin r$ is the angle of refraction, and $n$ is the index of refraction of the earth medium 2 with respect to air, it will be found that $\tan r = 1/\sqrt{n^2-1}$ (at grazing incidence $\sin i = 1$), and that Equation 3 becomes:

$$d=\frac{a\sqrt{n^2-1}}{2} \qquad (4)$$

where $d$ and $a$ are expressed in the same units. This equation may be used to find the depth $d$ of a subsurface reflector when the spread $a$ and the refractive index $n$ of the medium (or media) overlying the reflector are known. Methods will be described hereinafter for determining $n$.

Figure 3:
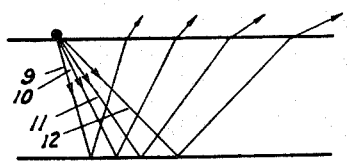
Fig. 3 is a diagrammatic drawing which illustrates a conventional radiating means positioned on the earth's surface, and propagating electromagnetic rays along a variety of paths to a subsurface reflector, which returns the said rays to the said earth's surface, where they arrive in different space and time phases.

Before proceeding further it is desirable to draw particular attention to the important difference between the novel underground ray paths utilized by this invention and presupposed by Equation 4, and the ray paths customarily employed by the prior art methods, so as to understand clearly the advantages that are inherent in the method disclosed herein. The distinction is indicated diagrammatically in Figs. 3 and 4, each of which shows a wave source located on the earth's surface and propagating electromagnetic rays downward toward a reflector that lies parallel to the said surface, the said rays being returned to the said surface by the said reflector. With the prior art methods the rays are generally presumed to travel into the earth along various paths, some of which may be represented by the lines 9, 10, 11 and 12 of Fig. 3. Each of these rays will differ in space phase, and probably in time phase, when it emerges from the earth's surface, and furthermore, different "reflections" from the underground reflector may be observed on the said surface at locations which vary from immediately adjacent to the wave source to points far removed therefrom, so that there is no fixed relation between the depth of the said reflector and the spread at which its reflections are observed. The reflections at the earth's surface therefore represent a confused assortment of reflected energies, which become more confused when the investigation is extended deeper and additional reflectors are involved.

Contrasted with this, however, is the unique and simplified mechanism illustrated in Fig. 4, where it is noted that in the case of the present invention each underground ray path, such as that indicated by the line 13, is geometrically identical; that the space phase and the time phase of each emergent ray is the same at any given point, thus leading to a cumulative action along the path 14; that the spread $a$ between the entrance and emergence of a ray is the same for each ray, and that the said spread $a$ is a measure of the depth of the subsurface reflector.

When the subsurface reflector is not parallel to the earth's surface but is inclined thereto, the various ray paths remain mutually parallel in the case of the present invention, but the lengths of the said paths vary, so that the time phase between the reflected rays and the wave (or bundle of rays) that travels along the surface of the earth varies continuously along the traverse investigated, as does the depth of the reflector. In this event the profile will display a characteristic series of maxima and minima, indicating constructive and destructive interference between the surface wave and the reflected rays. The maxima and minima (and other like points) will be evenly spaced a distance $\Delta s$ apart, as shown in Fig. 5. For a given frequency, the spacing $\Delta s$ depends only on the dip $\theta$ (Fig. 6) of the reflector and the refractive index $n$ of the material overlying the reflector 15, and is therefore independent of the depth of the said reflector. It can be shown that, when the transverse is oriented normal to the strike of the reflector, the dip angle $\theta$ is given by the following equation:

$$\theta = \cos^{-1}\sqrt{\frac{n^2-\left(\frac{\lambda}{\Delta s}-1\right)+\sqrt{\left[n^2-\left(\frac{\lambda}{\Delta s}-1\right)^2\right](n^2-1)}}{2n^2}} \qquad (5)$$

where $\lambda$ and $\Delta s$ are in the same units. The angle $\theta$ is positive when the slope of the reflector is downward from the receiver to the transmitter, and negative (or $\pi - \theta$) when the slope is downward to the receiver.

If the direction of the traverse were not perpendicular to the strike of the reflector, it would in general require two non-parallel traverses in order to determine the attitude of the said reflector.

After the dip of the reflector is found, its depth at various points may also be computed. The depth of one such point is expressed by:

$$d_0 = a(\sqrt{n^2-1} + \tan \theta)\left[\frac{\sqrt{n^2-1}\cos 2\theta + \sin 2\theta}{2\sqrt{n^2-1}\cos 2\theta - (n^2-2)\sin 2\theta}\right] \quad (6)$$

where $d_0$ is the depth of the reflector substantially below the wave source, and $a$ is the minimum spread for the detection of reflected rays, which can be found from the profile.

Consider next a case involving multiple reflectors that are parallel to the ground surface, such as illustrated diagrammatically in Fig. 7, where the formations 16, 17 and 18 have different indices of refraction. In Fig. 7 it is assumed that $n_1 < n_2 < n_3$, though the discussion to follow is valid for other distributions of $n$.

The profile of Fig. 8 shows the "breaks" that may be observed in running a traverse over multiple reflectors of the character described. If field-intensity measurements with the receiver R were commenced at the point C (Fig. 7), and continuous or successive readings were made along a transverse extending to the point D, it would be noted that the profile progressively declined until the first reflected ray 19 from the top of the formation 17 returned to the earth's surface 20 at the point 21; that here the profile would exhibit a break between $g$ and $h$; that the decline in the profile continued to $j$, where reflections would be received from the top of the formation 18; that the decline again continued between $k$ and $m$, where reflections would be detected from the base of the formation 18, and that beyond this break the profile would resume its normal decline between $o$ and $v$.

The conditions described in the preceding paragraph may be understood better from a consideration of the vector time diagrams appearing in Figs. 9, 10 and 11. In Fig. 9 the vector $E_{22}$ represents the field intensity of the surface wave 22 (Fig. 7) in the vicinity of the traverse point 21, and the vector $E_{19}$ represents at the same location the field intensity of the reflected rays from the top of the formation 17, the first of the said reflected rays traveling the ray path 19. The composition of these two vectors gives the resultant $E_{23}$, which causes the break between $g$ and $h$ of the profile shown in Fig. 8, the said break being upward because the magnitude of $E_{23}$ exceeds that of $E_{22}$. The resultant $E_{23}$ is effective in actuating the receiver R between $h$ and $j$ of the said profile, but in the traverse interval involved the amplitude of the said resultant declines, as will be referred to more particularly hereinafter. In the vicinity of the traverse point 24, the amplitude of the vector $E_{23}$ (Fig. 10) is reduced to that of the vector $E_{26}$ through composition with $E_{25}$, which represents the field intensity of the reflected rays that arrive in the neighborhood of the said point 24 from the top of the formation 18, the path of the first of the said reflected rays being indicated by the line 25. The vector $E_{26}$ is smaller than $E_{23}$, and hence the break at $j$ said reflected rays being indicated by the line 25. The vector $E_{26}$ is smaller than $E_{23}$, and hence the break at of Fig. 8 is downward. Vector $E_{26}$ remains effective (from $k$ to $m$ on the said profile) until the receiver R reaches the traverse point 27, where reflections from the base of the formation 18 arrive at the earth's surface 20, as indicated by $E_{28}$ of Fig. 11. Here the vectors $E_{26}$ and $E_{28}$ combine to give the resultant $E_{29}$, which causes an upward displacement of the profile of Fig. 8 as the amplitude of $E_{29}$ is greater than that of $E_{26}$. The vector $E_{29}$ remains effective in energizing the receiver R between $o$ and $v$ of the aforesaid profile.

It is important to note from the foregoing discussion that each discontinuity in $n$ will give rise to reflections that arrive at the receiver and cause a break in the profile, and that the corresponding spread between the transmitter T and receiver R is a function of the depth of the said discontinuity. It will be understood that the shape of the said break in the profile will depend on the relative amplitudes and time phases of the waves involved in the interference phenomenon, and that the hypothetical profiles of Figs. 2, 5 and 8 are to be regarded as illustrative and not definitive. It is also important to remember that all of the reflected rays that reach the receiver from any given discontinuity of the type referred to will have the same time phase and space phase with respect to the surface wave, so that with increasing spread the resultant elliptically polarized field at the receiver will remain constant—except for its normal decline due to the sphericity of the radiated waves, attenuation losses and successive penetration of the earth—until additional reflections are received from a deeper discontinuity, when the mechanism is repeated.

A particular anomaly, which is indicative of the reception of rays that are reflected by a given subsurface reflector, is therefore initiated by the first reflected ray from the said reflector. As the spread is gradually increased, additional reflected rays from the said reflector reach the receiver, and the amplitude of the said anomaly increases, until finally the influence of the increase in reflected energy is compensated by the subtractive effects specified in the preceding paragraph, and the profile then displays a progressive decline in intensity with increasing spread until another reflection appears on the said profile. The profile of Fig. 14 illustrates the mechanism here outlined better than the simplified curves of Figs. 2, 5 and 8.

It has been found that the minimum spread to detect reflections from the lowermost of a series of reflectors, all parallel to the earth's surface, is given by the equation:

$$a_p = 2\left[\frac{t_1}{\sqrt{n_1^2-1}} + \frac{t_2}{\sqrt{n_2^2-1}} = \cdots \frac{t_p}{\sqrt{n_p^2-1}}\right] \quad (7)$$

where $a_p$ is the spread corresponding to the lowermost reflector and $t_p$ is the vertical distance from the lowermost reflector to the reflector next above. The $a_1, a_2, a_3, \ldots a_p$ spreads can be determined from the breaks on the profile, and beginning with the shortest spread, the depth $d_1$ of the uppermost reflector may be found as already set forth herein. The process is then repeated for the second reflector, and so on downward until the lowermost reflector is reached. The depth of the lowermost reflector, $d_p$, is expressed by the relation:

$$d_p = d_{p-1} + \frac{1}{2}(a_p - a_{p-1})\sqrt{n_p^2 - 1} \quad (8)$$

It is to be understood, of course, that Equation 4 makes it possible to determine the depth of the said lowermost reflector directly from its related profile break, provided the effective (apparent or weighted-average) refractive index is known for the overlying geologic media.

The same general technique set forth in connection with Fig. 6 has been used to determine the dip of multiple parallel or non-parallel reflectors that are inclined to the earth's surface. When parallel reflectors are involved, it is only necessary to find the dip of the uppermost reflector, as already described. With non-parallel reflectors, successive maxima or minima, or other like points on the profile, are correlated with their respective reflectors, commencing with the uppermost reflector, and extending the analysis to the longer spreads and deeper reflectors. The problem is often simplified by the fact that the character of the cyclic anomalies caused by many reflectors is sufficiently diagnostic to assist greatly in identifying the said anomalies with their respective reflectors. When the said non-parallel reflectors dip in different directions, it will require more than one non-parallel traverse to determine the respective reflector dips.

The foregoing theory of operation of the invention has involved two assumptions, namely: (1) that the electromagnetic waves propagated by the transmitter are incident on the earth's surface at substantially 90 degrees, or at grazing incidence, and (2) that the radiating means and the receiving means are located at negligible heights above the earth's surface. These assumptions deserve comment.

Optical theory indicates that an electromagnetic wave, regardless of its polarization, would be totally reflected at the earth's surface were it incident thereon at precisely 90 degrees, and accordingly, none of the incident energy would be transmitted into the earth. Fortunately, however, true 90 degree incidence would only be realized if the earth were a perfect conductor, which, of course, it does not even approximate. The earth is a partial conductor, resembling more a dielectric than a conductor (at radio frequencies), but having some of the properties of each.

Among those familiar with wave propagation, it is an accepted fact that a plane electromagnetic wave, whose electric vector is parallel to the plane of incidence and lies in the wave front (herein termed a "vertically polarized" wave), will have its wave front tilted forward as it moves along the earth's surface. As the direction of propagation is normal to the wave front, it necessarily follows that the angle of incidence at the earth's surface is less than 90 degrees. This condition, which applies in the case of the preferred type of surface wave specified herein, leads to the progressive transmission of energy into the earth at angles of incidence that normally differ but little from grazing incidence.

The application of the invention in different parts of many oil-producing districts of the United States has demonstrated that, in general, the assumption of grazing incidence can be made without introducing errors in the results that exceed practical tolerances. This is for the reason that, in the areas investigated, the tilt of the incident wave front ordinarily is relatively small, and too, there is a compensating effect after the wave enters the earth and travels therein.

Consider next the second assumption involved in the preceding theory of operation, i.e., that the radiating means and the receiving means are located at negligible heights above the earth's surface.

In the practical application of the herein disclosed method, notable advantages result from the use of radiating and receiving means that are positioned comparatively close to the earth, as hereinafter more fully explained, together with the transmission of energy into the earth and its reception therefrom at substantially grazing incidence. The mode of operation is unique in that, without the aid of a cumbersome directive antenna system, it makes possible the directional transmission of said energy into the earth. The said operation is also unique in the progressive character of the transmission. The directional and progressive aspects of the said transmission (and reception) constitute important elements of the novel method set forth herein, and they also distinguish the instant invention from the prior art methods utilizing electromagnetic waves.

The theory of operation of the invention now has been covered in sufficient detail to warrant consideration of its application to practical problems whose solutions are of importance in geologic and geophysical investigations.

Numerous applications of the invention in practice might be cited, and will occur to those versed in the geophysical art, but it is considered unnecessary to mention more than one illustration of each of the three general classifications set out under the objects of the invention, that is, applications involving "horizontal" electrical discontinuities, "vertical" electrical discontinuities, and the determination of certain electrical characteristics of the subsurface media.

The application to be considered now is that of mapping the depth and structure of the various "horizontal" discontinuities that occur at the interface between the different geologic formations which comprise the stratigraphic section. The application here referred to concerns the structural problem most often encountered in applied geology and geophysics, and the importance of its solution is obvious.

On the earth's surface 30 of Fig. 12 is illustrated the transmitter T, and spaced therefrom along the traverse E—F are points of observation (stations) at which electrical measurements are made. Below the said surface is shown a sectional view of a part of the earth, which is made up of the formations indicated by the legend appearing in Fig. 13. It will be understood that the character, proportions, sequence and separation of the formations have been chosen arbitrarily for the purpose of illustration, and that the invention will function in a similar manner with different arrangements of the said formations, as well as with various combinations of other kinds of formations.

In the operation here considered, the transmitter T propogates vertically polarized electromagnetic waves of substantially constant amplitude and frequency along the surface 30 in the direction of F, and meanwhile a receiver measures the field intensity at successive stations along the traverse extending from E to F. The field intensity observed at each station then is multiplied by the spread between the said station and the said transmitter, and the logarithm of the product is plotted against the said spread. The procedure is repeated for each station included in the traverse E—F.

Denoting the field intensity by E and the spread between the transmitter and the various stations by $x$, and plotting the various log $(Ex)$ values against their respective spreads, there results a graph of the general form shown in Fig. 14, where each station value appears vertically above its respective station.

The functioning of the invention is almost self-evident from the interrelated diagrams appearing in Figs. 12 and 14, considered in connection with the preceding discussion of the operating principle of the invention. The line 31 is presumed to represent the first of many similarly refracted rays to enter the earth, and this ray is partially reflected at each lithologic boundary as indicated. For simplicity, the ray paths are shown as straight lines in Fig. 12, whereas in fact the slope of the said paths will change whenever the refractive index of the geologic media changes, becoming steeper as the refractive index increases. In general, however, the average ray paths will not differ greatly from the straight lines illustrated.

When the reflected rays (such as the ray 32) return to the surface 30, they combine with the surface wave, as already described, to produce a change in the receiver reading, and hence a change in the log $(Ex)$ value. An inspection of Figs. 12 and 14 will show that each formation contact is indicated by a change in the log $(Ex)$ value obtained at the station having the minimum spread permissible for the detection of the first ray reflected by the said formation contact. The presence of the various formation contacts is thus evidenced by the anomalies displayed by the $x$ versus log $(Ex)$ curve, and the minimum station spread related to a given anomaly is a measure of the depth of the associated formation contact.

The dashed line 33 of Fig. 14 represents an average of the undisturbed log $(Ex)$ values over the traverse illustrated. It is noted that the slope of this line changes at the points $w$ and $q$, and that these points correlate with the two most pronounced reflections exhibited by the graph. Such changes in gradient are expressive of considerable amounts of energy returned to the earth's surface by underground reflectors, as pointed out earlier in this specification.

Whether or not the gradient of the average line is increased or decreased by a certain strong reflection depends, as do the signs and amplitudes of the local anomalies, on the time phases and relative amplitudes of the surface wave and the reflected wave, and not on the attenuation of the waves as conventionally supposed, and as discussed in connection with Equation 1. This does not imply that gradient changes, or even local anomalies, can never be caused by variations in the attenuation due to corresponding variations in the electrical properties of the surface and near-surface geologic media, but rather that such effects generally are inconsequential in the operation of the invention. It will be found that the significant gradient changes ordinarily may be determined from observations obtained at widely separated stations, and that the spreads at which the gradient changes occur may be used to compute the depths of the reflectors responsible for the said gradient changes.

Knowing the spreads at which local anomalies or gradient changes are observed, the respective depths of the related subsurface reflectors may be computed from Equation 4. This requires that the effective refractive index of the geologic media overlying the reflector in question be known within reasonable limits, but further comment on the determination of quantitative reflector depths will be withheld until procedures are described for finding the refractive index.

It will be understood that the relation between $d$ and $a$ is linear, so that the depths of the various subsurface reflectors will be directly proportional to the spreads of their respective reflections, the proportionality factors being determined by the refractive indices related thereto. However, in view of the fact that satisfactory results generally can be obtained by assigning an effective index to a given geologic section, it is seen that the relative depths of the reflectors involved may be found by assuming an effective index for the section under investigation. Thus a calculated section, showing qualitative depths, may be computed simply by multiplying the various spreads by a factor less than unity. For frequencies of the order of two megacycles, this factor will in general lie between about 0.40 and 0.60, depending on the electrical characteristics of the section.

Since it is readily possible to utilize the invention to find the top and bottom of practically any subsurface stratum, it naturally follows that depth determinations may be carried out at various locations in a given area, and the quantitative or qualitative structure of almost any selected horizon or horizons thereby determined, in much the same way that the seismic method maps the configuration of boundaries that separate velocity contrasts. The present invention affords a significant advantage over the seismic method, however, in that it is particularly adapted to mapping the structure of porous formations, like sand bodies, which frequently act as reservoirs for oil and gas.

The foregoing description shows how the invention may be utilized to determine the presence, depth, thickness and structure of subsurface formations identified by anomalous refractive indices. This is tantamount to saying that the invention will delineate practically all of the formations lying within many thousands of feet of the earth's surface, inasmuch as experience demonstrates that substantially all of the formations have characteristic indices, and that the invention is operative to great depths. One will appreciate the importance of this application of the invention when it is realized that the results obtained are equivalent, in many practical respects, to those secured in the well-known procedure of electrically "logging" a bore hole by lowering an electrode assembly therein. The important distinction between the two systems is that the present invention provides its results without the necessity of having a costly bore hole drilled to the required depth of exploration.

The technique described involves a stationary transmitter in combination with a movable receiver which is operated at a series of spaced points along a traverse that preferably is directed substantially toward the said transmitter. This mode of operation was selected for discussion largely because of its simplicity, and for the sake of clarity, rather than the fact that it necessarily represents the preferred mode of operation. Brief reference will be made to modifications that may at times be found advantageous in the procedure described, and to alternative modes of operation.

It is obvious that better definition of the $x$ versus log $(Ex)$ curve, and consequently more detailed and accurate indications of subsurface conditions, will be obtained by decreasing the interval between adjacent receiver stations, and that the best definition, detail and accuracy will be secured when the receiver is operated continuously through its traverse interval, its readings being photographically recorded on a film whose movement bears a known relation to the varying spread between the transmitter and receiver. The relation between film movement and spread may be established in various ways, for instance, by "keying" the wave transmission at various known spreads, so that identifying marks will appear on the said film at selected spread intervals. When continuous operation of the receiver is employed, the anomalous readings related to a particular subsurface formation will be observed in a traverse interval precisely bounded by the emergent waves from the top and bottom of the said formation, rather than displaced at times with respect to the said interval, as shown in Fig. 14.

Alternatively, the receiver may be operated in a fixed location, and the spread varied by moving the transmitter through the required traverse interval, or the spread may be varied by the simultaneous movement of both the transmitter and the receiver, so as to restrict the electrical investigation substantially to a vertical line situated approximately midway between the said transmitter and receiver. The movement of the transmitter and/or receiver may be continuous or in discrete steps, depending on the fidelity with which the electrical profile is to be determined. It is evident from Fig. 12 that when the spread is varied in successive increments, the magnitude of the said increments must be small enough to disclose the thinnest formation under investigation. As a generalized statement, it may be said that the spread variation between successive receiver observations should not exceed twice the thickness of the thinnest formation to be mapped. The results of practical surveys indicate that a spread increment of 25 feet usually gives good definition of the subsurface, and that fair definition is often secured with an increment of as much as 250 feet. The same general rule applies in the case of gradient observations, the spread increment being chosen so as not to exceed approximately twice the interval between well-defined underground reflectors.

Another mode of operation involves the use of two or more spaced receivers whose respective readings are observed simultaneously, or whose outputs are fed into a suitable measuring means so as to indicate or record the sum or difference of two or more receiver readings, or the phase displacement between the electric fields at spaced points. This arrangement will be referred to more particularly hereinafter, but it may be stated here that the use of multiple receivers generally leads to the observance of anomalies that may be interpreted and correlated with greater certainty than when the anomalies are measured with a single receiver. This is especially true when a mobile transmitter is employed.

One should understand that, with any of the modes of operation specified, it is necessary to obtain receiver observations only through that portion of the traverse where reflections are obtained from the subsurface formation or formations under examination. For instance, if interpretable reflections are observed from the top of a particular formation lying at a depth of 5,000 feet with a spread of say 12,000 feet, and it is desired to find the depth of the said particular formation at an adjacent location, or it is desired to map the structure of the said particular formation by determining its depth at various points in a given area, then the problem can be solved by obtaining receiver observations along a relatively short traverse interval whose average distance from the transmitter approximates 12,000 feet. Progressive changes in the elevation of the reflector lead to corresponding changes in the spread of its reflections, so that a given reflector ordinarily may be mapped over a considerable area by running a series of short profiles covering the proper spreads.

It will be noticed that only field intensities were considered in presenting the operating principles of the invention, but that in constructing the graph appearing in Fig. 14 the logarithm of the product of the field intensity and the respective spread was used. Either of these quantities, as well as others to be mentioned later herein, may be employed to display the profiles obtained. Generally speaking, the use of the logarithmic values are preferable when comparatively short spreads are involved, as they greatly reduce the pronounced slope of a short-spread field-intensity profile, and thereby better disclose the local anomalies and gradient breaks, particularly those of minor order. However, when relatively long spreads are used, and the normal slope of the field-intensity profile is accordingly moderate or small, it will be found that the electrical data may be satisfactorily displayed by plotting field intensities against spread.

The application next to be considered for the invention is that of mapping "vertical" electrical discontinuities. Probably the most important case of this kind occurs at the peripheral boundary of a buried oil accumulation, where the said accumulation usually is in contact with salt water. The boundary separating the oil and salt water is not actually a vertical discontinuity, but may be regarded as such for the purpose of illustration.

In Fig. 15 is shown a plan view of the oil accumulation 34, which is surrounded by the salt water 35, as indicated more particularly in the vertical sectional view appearing in Fig. 16. For simplicity, the porous medium that contains the said oil and salt water is drawn horizontal and parallel to the earth's surface 36, instead of arched upward or inclined as would be the case for an anticlinal or stratigraphic trap respectively; the oil-water "contacts" 37 and 38 are assumed to be vertical boundaries, and the formations that overlie and underlie the oil-saturated medium are deleted in the drawings.

If the wave source T transmits the surface wave 39, and field-intensity measurements are made along the traverse G—H, then a profile similar to that indicated by the graph 40 of Fig. 17 may be obtained. The profile will display two significant breaks, such as those illustrated at $y$ and $z$, and one of the said breaks will lie substantially over the boundary 38, while the other break will occur at a considerable distance to the right of the said boundary.

Investigation will show that the break $z$ may be explained on the hypothesis that a pronounced phase shift takes place between the rays reflected by the oil accumulation 34 and those reflected by the salt water 35. Such a phase shift is consistent with optical theory, since an oil medium ordinarily will be optically rarer than the overlying stratum, thus causing little or no phase displacement at its surface, but a salt-water medium ordinarily will be optically denser than the overlying stratum, and this condition will result in a phase shift of considerable magnitude (sometimes approaching 180 electrical degrees) at its surface. Reference to the optical counterpart of the phenomenon here referred to will be found in many advanced textbooks on physics, for example: Verschoyle's English translation of Arthus Haas' "Introduction to Theoretical Physics," vol. 1, p. 283, Constable & Company, Ltd., London (1933).

In addition to a difference in phase between the rays reflected by the oil and salt-water media respectively, there will be a change in their relative amplitudes on reflection, owing to the fact that the reflectivity of the salt-water medium generally will differ greatly from that of the oil medium, and the amplitude change will influence the magnitude of the said break $z$.

It will be seen then, that the incident rays 41 and 42 have particular phase and amplitude relations when they impinge on the oil medium 34 and the salt-water medium 35, but there will be a large phase shift between the reflected rays 43 and 44, and the said reflected rays will have different amplitudes, so that when they reach the earth's surface 36, and combine with the surface wave 39, their phase and amplitude differences will cause the break $z$ in the field-intensity profile of Fig. 17. It will be brought out later herein that the presence of a subsurface oil boundary, such as the boundary 38, may be determined by measuring parameters other than the field intensity, for instance, by phase measurements that involve the phase displacement between the rays reflected by the oil medium and those reflected by the salt-water medium.

The break $z$, which is termed the "delayed break," will lie beyond (measured from the wave source T) the point 45, situated vertically above the boundary 38, by an amount equal to the distance $S_{db}$, where $S_{db}$ is denoted the "delayed-break spread," whose value is given by:

$$S_{db} = \frac{d}{\sqrt{n^2 - 1}} \qquad (9)$$

where $d$ is the depth of the boundary 38, and $n$ is the effective refractive index of the media overlying the said boundary. It will be seen that the delayed-break spread is one-half the distance $a$ appearing in Equation 4.

The occurrence of the break $y$, which is observed approximately over the boundary 38 and is denoted the "contact break," may be explained by a mechanism that is postulated on diffraction, in much the same manner that a diffraction pattern is caused by electromagnetic radiation, such as light, passing the edge of a medium having relatively high reflectivity, such as the salt-water stratum 35. The diffraction phenomenon here considered is discussed in a number of advanced textbooks on physics and optics, a pertinent reference appearing in Mann and Millikan's English translation of Paul Drude's "The Theory of Optics," pp. 203–213, Longmans, Green and Co., New York (1939). It will be found that a rigorous definition of the character and location of the break $y$ involves a number of variables, among which may be mentioned the electrical properties of the oil-saturated stratum 34, the salt-water stratum 35 and the overlying geologic media; the physical dimensions and depth of the said oil-saturated stratum, and the wave length of the radiation employed. For present purposes, however, it is sufficient to state that an interpretable profile break, such as the break $y$ in Fig. 17, ordinarily will be observed on the earth's surface 36 at or near the point 45, which is located along the line 46, lying vertically above the oil-water boundary 38.

It will be understood that breaks similar to those shown at $y$ and $z$ of Fig. 17 would be observed on profiles obtained along other traverses, and with other positions of the wave source. The traverses should, of course, pass over (or substantially over) the oil accumulation, and the wave source should be laterally removed from the oil boundary by a spread not less than the delayed-break spread, so as to permit incident rays such as 41 and 42 (Fig. 16) to strike near the said oil boundary, and thereby cause reflected rays such as 43 and 44 to appear at the earth's surface. The spread between the wave source and the point 45 should not therefore be less than $S_{db}$, nor should it be so large as to reduce excessively the amplitudes of the incident rays that strike in the neighborhood of the oil boundary 38. These limits bound roughly the operative spread interval, and somewhere between the said limits will be obtained the best electrical definition of the underlying oil contact. The optimum wave-source spread differs in accordance with the physical and electrical conditions involved, but it is known that the said spread is not critical, for well-defined contact indications frequently are obtained when it is four or more times the delayed-break spread. In the preferred mode of operation the wave source is located substantially along a prolongation of the receiver traverse, such as the traverse G—H of Fig. 15, but the invention is operative when the said wave source is considerably removed therefrom, particularly when the surface wave is propagated by a non-directive radiator, that is, a radiator having a horizontal field pattern that is not sharply directional.

An alternative mode of operation is indicated in Fig. 18. Here the wave source T is positioned over the oil accumulation 48, and radial traverses are arranged to extend a sufficient distance beyond the said oil accumulation to permit detection of the respective delayed breaks. For example, the traverses J—K, L—M, N—O and P—Q may be employed, and the boundary of the oil accumulation 48 could be found by profile breaks similar to those displayed by profile 40 of Fig. 17. As receiver observations may be made simultaneously along each of the traverses, the technique here outlined is especially suited to the rapid investigation of large areas, when it is desired to determine if the said areas embrace an oil accumulation or accumulations. Furthermore, the said method is also well adapted to the delineation of oil fields that have been discovered by drilling, but are not defined in areal extent. For such a case, the wave source is positioned near the discovery well, and radial traverses are arranged in the desired directions. If the discovery well is located near one side of the oil accumulation, it may be necessary to reposition the wave source in order to develop a contact break and a delayed break on each of the profiles obtained.

The preceding discussion has, for the sake of simplicity, been restricted to a consideration of how the invention functions in disclosing one boundary of a given oil accumulation that lies at a particular depth, as for example, the boundary 38 of Fig. 16. It will be recognized, however, that when the wave source T is far enough to the left of the point 49 to allow incident rays such as 50 and 51 to impinge on the oil boundary 37, then the mechanism already described will likewise be operative in causing a phase shift and a change in amplitude between the reflected rays 52 and 53, and the said phase shift and/or amplitude change may be used to disclose the presence, location and depth of the boundary 37. The contact break and the delayed break for the boundary 37 do not appear on the profile 40 of Fig. 17 because the traverse G—H commences at the point 54, whereas it would have to be extended to the left of the point 55 to reveal the delayed break associated with the boundary 37, and to the left of the point 49 to detect the contact break related to the said boundary.

A somewhat similar method of developing boundary anomalies over oil-water contacts such as that indicated by 37 of Fig. 16 is disclosed in applicant's U.S. Patent No. 2,172,688, issued September 12, 1939, under the title "Electrical Apparatus and Methods of Geologic Studies," but the successful operation of the method therein disclosed requires that the wave source be carefully positioned with respect to the location and depth of the oil boundary under investigation. This is a tedious and costly requirement in practice, particularly when searching in "wildcat" areas for oil boundaries whose locations and depths are both unknown. The fact that the operation of the present invention does not necessitate the accurate positioning of the wave source therefore constitutes an important advantage over the method described in the patent referred to.

Multiple zones of oil saturation, positioned vertically with respect to one another, will cause multiple pairs of contact breaks and delayed breaks, the respective delayed-break spreads being a measure of the depths of the associated oil boundaries. Complicated profiles may arise from this condition, but experience has shown that the depths of multiple oil zones can ordinarily be determined, and their horizontal configurations mapped, by a careful correlation of the breaks exhibited by the profiles obtained along various traverses that pass over the said multiple zones. When the profiles are long enough to disclose both boundaries of each oil zone, then the analysis may be aided by the fact that each zone causes two pairs of profile breaks, and since the delayed-break spread must be approximately the same for each pair of breaks, it follows that the said two pairs of breaks can thereby be identified, checked and correlated with the particular zone responsible for the said breaks. Moreover, identification of the respective breaks may be further aided by selectively adjusting the spread between the wave source and the oil boundary under examination, since only the shallowest boundary is disclosed by the shortest effective spread, and progressively deeper boundaries are revealed as the wave source is moved farther and farther away from the various boundaries.

Not only can the horizontal configuration and depth of an oil accumulation be determined by means of contact breaks and delayed breaks, but the invention also provides a method of finding the vertical thickness of the said oil accumulation. In the simplified diagram of Fig. 16, the mechanism responsible for the delayed break was, for the sake of clarity, shown to involve the reflection of rays only from the top surfaces of the oil medium 34 and the salt-water medium 35. Actually, however, the rays incident on the media 34 and 35, such as the rays 41 and 42, may be partially refracted into the said media and then some of the energy in the said rays may be returned by reflection from the bottom surfaces of the said media to the air-earth interface 36. The delayed break may therefore evidence reflections from both the top of the media 34 and 35 and the bottom of the said media, and since the separation along the earth's surface of the top and bottom reflections is a measure of the vertical thickness of the said media, as was explained in connection with Fig. 12, it accordingly follows that the characteristics of the delayed break may be used to determine the thickness of the oil-saturated medium that influences the said delayed break. The vertical dimension of the oil medium may also influence the characteristics of its associated contact break, and this relation furnishes another check on the thickness of an oil deposit whose presence is indicated by the invention.

Thus far consideration has been given only to oil accumulations that are bounded by salt water, but it is important to mention that the invention will function in a similar manner when the oil accumulation is not bounded by salt water. For instance, a contact break and a delayed break may be caused by an oil boundary that occurs at the edge of an oil accumulation contained in a formation that "wedges out" up dip, or at the edge of an accumulation due to differential porosity in the reservoir stratum, or that occurs at a fault plane, or in "shoestring" sands, and under many other conditions where the oil deposit is bounded by materials other than salt water. The electrical indications of underlying oil boundaries usually are more pronounced when salt water is present at the peripheral oil contact, owing to the enormous difference between the refractive indices of oil and salt water, but the invention will also function in a definite and useful manner when the said salt water is absent, since the refractive index of an oil-saturated stratum also differs appreciably from that of the various sedimentary materials that frequently are present at the boundaries of oil accumulations.

It will be noted from Equation 9 that the delayed-break spread, or the separation on the earth's surface of the contact break and the delayed break, is a function of the depth of the oil boundary and the refractive index of the material overlying the oil accumulation. This relation is important, for the delayed-break spread provides a criterion for determining the depth of an "unknown" oil accumulation whose presence is indicated by the method described. In general, the delayed-break spread varies from about 0.80 to 1.30 times the depth of the associated oil boundary throughout the Mid-Continent and Gulf Coast oil-producing areas of the United States. This relation makes it possible to compute the approximate depth of an unknown oil accumulation from the magnitude of the delayed-break spread related thereto.

It is evident from what has gone before that the refractive indices of the geologic media play an important part in the functioning of the invention. It has been shown that a determination of the depth of a subsurface reflector requires that the refractive index of the medium overlying the reflector be known, and that for multiple reflectors it is necessary to know the refractive index of each of the media, or the effective index of all of the media, overlying the reflector whose depth is needed. And in the preceding paragraph it is pointed out that the application of Equation 9, to find the depth of an oil boundary, likewise requires that the effective index of refraction be known for the strata overlying the said boundary. It is, accordingly, important to have a method of determining the refractive indices of different strata, or of finding the effective index of a particular geologic section. This is true not only for the present invention, but for all geophysical methods employing electromagnetic waves.

One method of arriving at the refractive index is to obtain a profile in the vicinity of a well that provides either a driller's log or an electrical log, and then compute the index or indices required with the aid of the reflector depths shown by the well log. This need involve nothing more than a profile similar to that illustrated in Fig. 14, where the stratigraphic sequence, such as that appearing in Fig. 12, would be known from the said well log, and the effective index of the media overlying a chosen reflector could be computed from the following expression:

$$n = \sqrt{\left(\frac{2d}{a}\right)^2 + 1} \qquad (10)$$

since the spread $a$ may be found from the said profile and the depth $d$ would be given by the said well log. More particularly, one may find the refractive index of each stratigraphic unit by making use of Equations 10 and 7 and proceeding as follows. Using the values of $a$ and $d$ that correspond to the first (uppermost) reflector, the index $n_1$ of the overlying medium is found from Equation 10. Inserting the value of $n_1$ in Equation 7, dropping all terms on the right side of the equation except the first two, and putting the spread $a_2$ related to the second reflector on the left side of the said equation, the index $n_2$ of the medium between the first and second reflectors may be computed, inasmuch as $t_1$ and $t_2$ are known quantities. By a repetition of this process the index of the next unit in the sequence may be determined, and so on down to the lowermost reflector.

Alternatively, the refractive index of the medium (or the effective index of the media) overlying a given oil accumulation may be found from the relation:

$$n = \sqrt{\left(\frac{d}{S_{db}}\right)^2 + 1} \qquad (11)$$

provided the depth of the oil boundary and the related delayed-break spread are known. Thus by obtaining profiles over oil deposits lying at different depths, the value of $n$ may be determined easily for various areas and depths. Conversely, it will be understood that the depth of an unknown oil boundary may be computed with considerable accuracy from its associated delayed-break spread, after reliable data are available to indicate the value of $n$ in Equation 9 for the depth and general area concerned.

When the refractive-index determinations are carried out in an area where the dip of the reflector (or oil-saturated stratum) in question is large, it may at times be preferable to have subsurface information from two or more wells, so that the dip may be taken into account and the traverse arranged substantially perpendicular to the strike of the said reflector. This precaution becomes more important as the dip and the refractive index increase, and is of greater significance in the converse problem of finding the depth of a reflector when the index of the overlying material is known. It will be understood, however, that the regional dips of many strata are well established in various geologic provinces, so that reasonably close estimates of dips can oftentimes be made even though subsurface information is not available from two or more adjacent wells. Predicated on such dip estimates, the values determined for $n$ (or $d$) usually will lie within the required limits of accuracy. When the dip of the reflector exceeds some 300 feet to the mile (about 3 degrees), it generally is preferable to take into account the said dip, and to find the refractive index by solving Equation 5 for $n$.

At this point it is well to mention that reflector dips of large magnitude may sometimes bring about a peculiar situation in practicing the herein disclosed method. The situation referred to is indicated diagrammatically in Fig. 19, which illustrates the path of an electromagnetic ray that enters the earth at grazing incidence, is returned to the earth's surface by a reflector having a steep "negative" dip, and instead of emerging at the earth's surface the ray is reflected downward at the said surface. Optical theory shows that this will always occur when the reflector has a negative dip, since the angle of incidence, $i$, at the earth's surface will then exceed the critical angle $$\left(\sin^{-1}\frac{1}{n}\right)$$

and total reflection will occur. Actually, however, the earth's surface is not an optically plane surface, but usually is characterized by sufficient topographic relief to prevent total reflection for the very moderate reflector dips ordinarily encountered. Practical experience with the invention demonstrates that total reflection at the air-earth interface rarely occurs. But when the condition does exist or is suspected, it may be completely overcome by the simple expedient of transposing the positions of the transmitter and receiver, so that for the new set-up the dip of the reflector would be "positive," as indicated in Fig. 6.

Experience has also shown that the refractive indices of various strata remain approximately constant over considerable areas, and consequently, values once determined in a particular locality frequently may be extrapolated into adjacent areas without introducing appreciable errors. This statement presupposes, of course, that the frequency of the radiation remains the same, for it is known that the refractive index varies as the frequency is changed. For a plane vertically polarized electromagnetic wave, incident on the air-earth interface, the relation between $n$ and $f$ is given by the following equation:

$$n = \sqrt{\frac{1}{2}\left[\mu\epsilon + \sin^2 i + \sqrt{\left(\frac{2\mu\sigma}{f}\right)^2 + \left(\mu\epsilon - \sin^2 i\right)^2}\right]} \qquad (12)$$

wherein $\mu$ is the magnetic permeability in electromagnetic units, which ordinarily may be considered unity, $\epsilon$ and $\sigma$ are respectively the dielectric constant and conductivity in electrostatic units, $f$ is the frequency in cycles per second, and $i$ is the angle of incidence made by the wave in air. When grazing incidence is involved, sin $i=1$, and this results in a simplification of Equation 12.

It will be noticed that the refractive index decreases with increasing frequency, and vice versa. This relation is important, since the functioning of the invention is predicated on the occurrence of subsurface electrical discontinuities, or more particularly, on the presence of boundaries separating media having different indices of refraction, and it is seen that the index of each of the media may be controlled by varying $f$. As the reflection coefficient of a particular boundary is dependent on the relative indices of the media on each side of the said boundary, it follows that the said reflection coefficient may be changed through wide limits by manipulating the frequency of the radiation. Inasmuch as the electrical properties of the various media probably will differ considerably from one another, the reflection coefficients of the several boundaries separating the said media will likewise behave differently under changing frequency, and hence the reflections from a given boundary may be emphasized while discriminating against the reflections from other boundaries. Conversely, the reflectivity of a given boundary may be decreased by a proper adjustment of the frequency, whereas the reflectivity of another boundary or boundaries may be simultaneously increased.

A practical example of the relation between the refractive index and frequency is shown by the $n$ vs. $f$ curve of Fig. 20, which was obtained by running electrical profiles at four different frequencies along a traverse that passed over the peripheral boundary of the Cedar Lake oil field, located in Gaines County, Texas. The depth of the oil boundary beneath the said traverse was known to be 4,864 feet, and the delayed-break spreads were shown by the profiles, so that the effective refractive indices could be computed with Equation 9. The variation of the delayed-break spread with frequency is indicated by the $S_{db}$ vs. $f$ curve. Fig. 20 brings out the significant fact that the effective refractive index is very low for the some 4,900 feet of geologic section examined. The $n$ values indicated are in good agreement with those found in many other areas, and their low order, which is far below that assigned to geologic media by previous investigators, accounts in a large measure for the remarkable depth penetration obtained with the invention. The claim of depth penetrations far in excess of those indicated in the geophysical literature is based not alone on the successful functioning of the invention under carefully controlled conditions involving the transmission of electromagnetic energy through many thousands of feet of sedimentary materials, but also on the direct experimental evidence provided by investigations carried out in the abandoned workings of a salt mine, where considerable energy was transmitted from a low-power transmitter at the surface of the earth to a receiver of low sensitivity positioned in the said mine, the said energy being transmitted through a minimum of 1,000 feet of geologic section, some of which comprised a high concentration of salt water.

Inasmuch as it is possible to experimentally determine the relation between $n$ and $f$ by means of delayed-break spreads over known oil fields, or by means of reflections from subsurface reflectors lying at known depths, it naturally follows that the dielectric constant and conductivity of geologic media may be computed by finding $n$ at two or more frequencies and solving Equation 12 simultaneously for $\epsilon$ and $\sigma$, the solution being performed in accordance with well-known mathematical processes. Knowing the dielectric constant and conductivity, the absorption factor, $\beta$, of different geologic media may be found at various frequencies by substituting in the following equation:

$$\beta = \sqrt{\frac{\mu}{2}\left(\sqrt{\epsilon^2 + \frac{4\sigma^2}{f^2}} - \epsilon\right)} \qquad (13)$$

in which the magnetic permeability $\mu$ may be considered unity for most sedimentary materials and independent of frequency. The absorption factor of the media is an important quantity in the application of any electromagnetic-wave method of prospecting, for it determines the attenuation suffered by a wave in traversing the said media. After $\beta$ is found the attenuation may be computed from the relation:

$$E_x = E_0 e^{-\frac{2\pi\beta x}{\lambda}} \qquad (14)$$

wherein $E_0$ is the amplitude of the incident wave, $E_x$ is the amplitude of the wave after traveling the distance $x$ through the medium, $e$ is the base of natural logarithms, and $\lambda$ is the wave length in free space, $\lambda$ and $x$ being expressed in the same units.

Furthermore, since the average magnitude of the related breaks disclosed by a representative number of field-intensity profiles is a measure of the amplitude of the emergent waves, it will be understood that the invention furnishes a technique of studying wave transmission as a function of frequency. As here used, the term "wave transmission" takes into account not only attenuation, but also the frequency dependence of the path length and the reflection coefficient of each subsurface interface through which the wave passes in its progress downward to a reflector and in its return to a receiving means near the earth's surface. By experimentally determining the effectiveness of the wave transmission at different frequencies, the invention therefore provides a direct method of finding the optimum frequency to be used in solving any subsurface problem involving reflection and/or refraction and/or diffraction phenomena.

Summarizing, the modes of operation disclosed in the two preceding paragraphs may be employed to determine at any workable frequency the effective values of the refractive index, dielectric constant, conductivity, and absorption factor of the stratigraphic section overlying a selected reflector, which, of course, may be an oil-saturated stratum. The said modes of operation not only make it readily possible to study the effect of frequency on each of the electrical characteristics enumerated, but they also provide a technique of analyzing the influence of frequency on the wave transmission related to different reflectors lying at various depths in the earth, and thereby determining the optimum frequency to be employed in a particular application of the invention, or of other systems utilizing electromagnetic-wave propagation through the earth. The electrical characteristics here considered take into account all of the earth properties that are of significance in the operation of most electromagnetic-wave methods of exploration, and hence the convenient and reliable determination of these characteristics in situ is of notable importance.

Not only does a general functional relation exist between the frequency and the refractive index, dielectric constant, conductivity and absorption factor, and between the frequency and wave transmission, but the variables specified change in an anomalous manner throughout certain frequency bands, owing to the fact that many geologic media exhibit selective-frequency characteristics. The optimum frequency to be used in practicing the herein described method will accordingly vary with the electrical properties of the geologic section under examination, and may be found as set forth. It is to be understood that the operation of the said method contemplates the use of any frequency that will, with the power available at the wave source, cause an electromagnetic disturbance to travel from the said wave source to the required depth, and thence back to a receiving means. The possible frequency range that may be utilized in practice will therefore be large. For present purposes it may be said that successful operation of the invention has been secured with a wave source that was capable of transmitting 80 watts at a frequency of 1,900 kilocycles.

The description of the method and modes of operation now is complete. Each of the modes of operation already described has involved the determination of a field parameter-spread curve by means of a single receiving means. It will, however, be understood from what follows that the simultaneous operation of two or more receiving means may sometimes be employed to advantage, since multiple receiving means are especially suited to the measurement of the various field parameters that are measurable with a single receiving means, and too, they make possible the convenient and reliable determination of the phase displacement between the electric fields at different receiving points.

Consider Fig. 21, which shows the spaced receiving means $R_1$ and $R_2$ positioned on the earth's surface 56, and respectively connected by cables 57 and 58 to the measuring means M. Line 59 represents a surface wave that moves to the right in the figure, and line 60 represents a ray that is returned to the surface 56 by an underground reflector. It is evident that the receiving means $R_1$ will be influenced only by the surface wave 59, but that the receiving means $R_2$ will detect both the surface wave 59 and the reflected ray 60. There will be a difference, therefore, in the readings of the spaced receiving means $R_1$ and $R_2$ due to the presence of the said underground reflector, and this difference may be determined by direct comparison, or by feeding the respective outputs of the said receiving means into the measuring means M. There may, of course, be a series of spaced receiving means, with provision for comparing their individual, totalized or differential outputs with one or more measuring means, and by proper switching arrangements the comparison may be made between any combination of two or more receiving means. Alternately, the said receiving means may be replaced by spaced "pickups," such as antennas, whose individual, totalized or differential outputs are observed by an appropriate receiving or measuring means.

The same technique may be applied in the detection of multiple subsurface reflectors; in determining lateral variations in the reflection coefficient of a particular reflector, and in mapping buried discontinuities that cause a phase shift and/or amplitude variation in some of the reflected waves. This mode of operation is illustrated in Fig. 22, and it will be seen that the receiving means $R_3$ is affected only by the surface wave 61 and the reflected ray 62, but that the receiving means $R_4$ is influenced by the surface wave 61, reflected ray 62 and the reflected ray 63. The difference in the readings of the receiving means $R_3$ and $R_4$ may be determined by direct comparison or by the measuring means $M_1$, connected thereto by the cables 64 and 65. It will be understood that the rays 62 and 63 may be reflected by two different subsurface reflectors, the ray 63 correlating with the deeper reflector, or that the two rays may be returned to the earth's surface 66 by a single reflector that is characterized by lateral variations in its reflection coefficient and/or by electrical properties that cause a phase displacement between the said two rays. The use of more than two receiving means, or spaced pickups with one or more receiving and/or measuring means, are obvious alternatives in this mode of operation.

The modes of operation described in the two preceding paragraphs may be employed to compare vectorially or otherwise at spaced points the instantaneous values of various field parameters, and to make such comparison at radio frequency. The principal distinction over the operating procedures mentioned earlier in this specification is that the earlier procedures performed many of the same functions by means of a series of observations obtained at discrete points, rather than a series of observations obtained simultaneously at spaced points.

It can readily be demonstrated that the multiple-receiver arrangements described are generally superior to a single receiver in their definition of underground electrical discontinuities, for the reason that a particular discontinuity ordinarily gives rise to substantially the same response, whereas the indication of a single receiver may differ from place to place, depending on the time phases of the surface and reflected waves. Another advantage of multiple receivers is that the power level at the associated transmitter need not be maintained as constant as when a single receiver is employed, and too, the changing environment of a mobile transmitter is of much less consequence in the case of multiple receivers, since they measure the sum of or difference between the values of a field parameter observed at spaced points, rather than the absolute value of the said parameter at a single point.

The apparatus indicated diagrammatically in Figs. 21 and 22 may be of various kinds which are well known to those versed in the geophysical and radio arts. For illustration, the receiving means $R_1$, $R_2$, $R_3$ and $R_4$ may be radio receivers of conventional types, which are designed to receive and amplify the incoming waves, and whose gain may be maintained substantially constant. The said receivers may be energized by any suitable form of antenna, such as loop antenna, and they normally are spaced a fixed distance apart during a series of observations, the said distance depending on the nature of the investigation, as was discussed previously in connection with the similar problem of selecting the station interval. When spaced receivers are used with an interconnected measuring means, it is preferable that the said receivers remain fixed in position while measurements are being obtained, and that any spread variation be secured by changing the location of the wave source related thereto. The measuring means M and $M_1$ may embody a differential transformer, so connected that the sum or difference of the respective receiver outputs is passed into an indicating or recording ammeter or voltmeter; or the said measuring means may consist of a cathode-ray oscilloscope, or when only phase relations are to be determined, it may comprise a conventional phase meter. The measuring means may, evidently, incorporate a suitable amplifier when required. It should be remembered that, in order to measure the vector combination of field-parameter values observed simultaneously with two or more receivers, it is necessary to preserve the vectorial character of each of the received waves until the said combination occurs in the means provided therefor. This may be accomplished by supplying the said receivers with matched radio-frequency amplifiers, together with matched and balanced transmission lines between the said receivers and the device in which the vectorial combination takes place.

It should be pointed out here that the measurement of the displacement between the phases of the waves observed at different receiving points does not necessarily require the above described measuring means, nor in fact does it necessarily require any metallic connection between the said receiving points. For instance, the said phase displacement may be determined with the aid of a signal generator that is operated in the neighborhood of the said receiving points, and which provides a reference signal with which is compared the phases of the waves detected at each of the said receiving points. Those skilled in the art will appreciate that various other types of apparatus and techniques may be adopted for the measurement of the said phase displacement, and that the use of the said measuring means is to be regarded merely as illustrative of the preferred apparatus and technique.

Suitable receiving apparatus to be employed in connection with the operation of multiple receivers, as well as that to be used in obtaining field-intensity observations with a single receiver, has been fully described in numerous publications in the prior art. Apparatus particularly adapted to the functioning of the present invention is described in applicant's co-pending parent application, subsequently abandoned, for "Transmitting and Receiving Apparatus and Method for Electromagnetic Prospecting," Serial No. 483,638, filed April 19, 1943, divisions of which are now Patents No. 2,585,907 and No. 2,661,466. The apparatus disclosed in these patents provides a directive radiating means, which comprises a wire placed along the surface of the earth, that produces a strong surface wave which impinges on the earth's surface at substantially grazing incidence, and too, it furnishes a receiving means that overcomes the difficulty pointed out in the discussion of Fig. 19. An alternative radiating means for propagating a surface wave of satisfactory character may comprise a single wire that is located a foot or so above the earth's surface and approximately parallel thereto; that lies substantially in the vertical plane that includes the receiver stations, and that has a length approximating one-quarter the length (in air) of the propagated waves. It is a characteristic of the radiators here referred to that their principal radiation occurs bidirectionally along their lengths, which results in "figure-eight" field patterns, as distinguished from the substantially circular field patterns identified with the elevated radiators employed in prior-art geophysical systems.

The proper positioning and arrangement of the radiating means are highly important in order to carry out the herein disclosed method, which necessitates the transmission of waves in a manner to simultaneously and progressively refract rays into the earth and downward along multiple substantially parallel paths, and in such manner that substantially all of the waves that impinge upon the earth's surface between the sending means and the receiving means impinge at approximately grazing incidence, including the area of the earth's surface in the vicinity of the sending means.

In all that has gone before, the operation of the invention has been postulated on variations observed in the field intensity or the time phase at one or more receiving points. It is desired to emphasize here that the field intensity and the time phase do not constitute the only quantities that are of significance in the invention's operation, but rather the preferred ones under the conditions ordinarily encountered in field practice.

Those versed in the art of electrical prospecting will recognize that other field parameters will vary simultaneously with the said field intensity and the said time phase, and that the theory and operation of the invention may accordingly be based on other parameters. Illustrative of this, the theory and operation of the invention may be predicated on the determination of the area of the field ellipse, or its spatial orientation, or on measurements of the magnitude of the major or minor axis of the said ellipse, or in fact, on the measurement of any selected component of the resultant field vector, or any quantity related thereto. In the claims appended hereto, the term "parameter" shall therefore be taken to include any of the field variables here specified, as well as any other quantity functionally related to the said field variables.

The herein discussion of the theory and operation of the invention has also contemplated the use of continuous and unmodulated vertically polarized sinusoidal electromagnetic waves whose frequencies lie in the radio spectrum. One versed in the art of electrical prospecting will understand, however, that the said theory and operation may be based on the use of interrupted waves instead of continuous waves; that various types of modulated waves may be employed to replace the preferred unmodulated waves; that different kinds of polarizations and wave forms may be substituted for the vertically polarized sinusoidal waves specified, and lastly, that electric currents or pulses may be used in place of the electric waves considered herein.

Furthermore, in applying the invention in practice, it has been found expedient and convenient not only to employ continuous and unmodulated waves, but waves whose frequency remains substantially constant during a series of observations, and it has also been found advantageous to maintain the amplitude of the waves radiated by the wave source substantially constant throughout a set of measurements.

Here again, however, it will be understood that departures are permissible from the preferred use of substantially constant frequency and amplitude. Frequency shifts at the wave source may be followed by a tunable receiving means and the said method will remain operative, though less convenient. And similarly, the method revealed will function even though the amplitude of the radiated waves changes during a series of observations. Moderate changes in amplitude are of little consequence with the modes that utilize multiple receivers, since, as already pointed out, these modes are based on a comparison of the values of a field parameter observed at spaced points, and therefore the absolute values of the said parameter do not enter directly into the observations. For the modes that make use of a single receiving means, various kinds of amplitude changes may be tolerated that do not cause a discrete anomaly or a gradient break in the resulting profile which may be confused with the reflection from a sub-surface reflector.

One versed in the art will understand, then, that substantially constant frequency and amplitude of the radiated waves are desirable and recommend characteristics with certain of the modes of operation set forth in this specification, but that the substantial constancy of these parameters does not constitute an essential theoretical or operating requirement of the invention.

It is to be understood that various modifications may be made in the method hereinbefore disclosed, and in the apparatus referred to for carrying it out, without departing from the spirit of the invention as defined in the following claims.

What is claimed as new and useful is:

1. The method of investigating earth formations including a subsurface reflector of electromagnetic waves lying substantially parallel to the surface of the earth, comprising propagating from a sending means electromagnetic waves substantially at grazing incidence onto the air-earth interface substantially at the location of said sending means so that a part of the radiation from said sending means travels along said interface to receiving means spaced apart from said sending means and a part of said radiation is refracted into said earth onto said reflector and thence to said receiving means, measuring at said receiving means a selected parameter of the electromagnetic field resulting from the combined waves arriving at said receiving means, and varying the spread between said sending means and said receiving means until the magnitude of said spread reaches a particular value that bears a predetermined relation to the depth of said reflector, said particular value lying within the range of 1.4 to 2.7 times the depth of said reflector, whereat the presence of said reflector is indicated by an anomalous variation in said parameter as measured by said receiving means, and the magnitude of said spread when said particular value is reached is a measure of the depth of said reflector.

2. The method set forth in claim 1 wherein said waves are vertically polarized.

3. The method set forth in claim 1 wherein the spread is varied in successive increments, none of which exceeds twice the thickness of said reflector.

4. The method set forth in claim 1 including the step of receiving said electromagnetic waves simultaneously at a plurality of points spaced apart along a line directed substantially toward said sending means, and the step of vectorilly comparing at radio frequency the instantaneous parameter values measured at said points.

5. The method of investigating earth formations including a reflector of electromagnetic waves lying beneath the surface of the earth, comprising propagating from a sending means electromagnetic waves substantially at grazing incidence onto the air-earth interface substantially at the location of said sending means so that a part of the radiation from said sending means travels long said interface to receiving means spaced apart from said sending means and a part of said radiation is refracted into said earth onto said reflector and thence to said receiving means, measuring at said receiving means a selected parameter of the electromagnetic field resulting from the combined waves arriving at said receiving means, and varying the spread between said sending means and said receiving means through a spread range sufficient to produce successive maxima or minima in the values of said spread parameter measured at said receiving means, the occurrence of said successive maxima or minima being indicative only of the presence of a subsurface reflector that dips with respect to the earth's surface and the spread between said successive maxima or minima being a measure of the dip of said reflector.

6. The method of investigating a subsurface mineral deposit, comprising propagating from a sending means electromagnetic waves substantially at grazing incidence onto the air-earth interface substantially at the location of said sending means so that a part of the radiation from said sending means travels along said interface to receiving means spaced apart from said sending means and a part of said radiation is refracted into said earth onto said deposit and thence to said receiving means, measuring at said receiving means the variation in a selected parameter of the electromagnetic field resulting from the combined waves arriving at said receiving means, varying the spread between said sending means and said receiving means by moving said receiving means along a traverse that crosses over a boundary of said deposit and is directed substantially toward said sending means until the presence of said boundary is indicated by a departure from normal in said variation that occurs substantially vertically above said boundary, and continuing to vary the spread along said traverse until another such departure from normal is indicated, the separation of the two such departures along said traverse bearing a predetermined relation to the depth of said boundary, said separation having a value that lies within the range of 0.6 to 1.5 times the depth of said boundary.

7. The method set forth in claim 6 including the step of positioning said sending means over said deposit prior to varying the spread between said sending means and said receiving means.

8. The method of determining the refractive index of the geologic media overlying a subsurface reflector of electromagnetic waves lying substantially parallel to and at a known depth below the earth's surface, comprising propagating from a sending means electromagnetic waves of a particular frequency substantially at grazing incidence onto the air-earth interface substantially at the location of said sending means so that a part of the radiation from said sending means travels along said interface to receiving means spaced apart from said sending means and a part of said radiation is refracted into said earth onto said reflector and thence to said receiving means, measuring at said receiving means the variation in a selected parameter of the electromagnetic field resulting from the combined waves arriving at said receiving means, varying the spread between said sending means and said receiving means until said spread reaches a particular value as indicated by an anomalous variation in said parameter caused by said reflector, and measuring said spread when said particular value is reached, said particular value bearing a predetermined relation to said refractive index as expressed by the formula:

$$n = \sqrt{\left(\frac{2d}{a}\right)^2 + 1}$$

where $n$ is the refractive index of the media overlying said reflector, $d$ is the depth of said reflector, and $a$ is said particular value of spread.

9. The method set forth in claim 8 including performing aforesaid procedural steps at a different frequency from said particular frequency, determining the refractive index corresponding to said different frequency, and determining the dielectric constant and conductivity of said media by algebraic processes involving the predetermined values of said refractive index.

10. The method of determining the refractive index of the geologic media overlying a subsurface reflector whose dip is known, comprising propagating from a sending means electromagnetic waves of a particular frequency substantially at grazing incidence onto the air-earth interface substantially at the location of said sending means so that a part of the radiation from said sending means travels along said interface to receiving means spaced apart from said sending means and a part of said radiation is refracted into said earth onto said reflector and thence to said receiving means, measuring at said receiving means the variation in a selected parameter of the electromagnetic field resulting from the combined waves arriving at said receiving means, varying the spread between said sending means and said receiving means along a substantially straight traverse that passes over said reflector, and measuring the separation along said traverse of recurrent like variations in said parameter which are caused by the reception of waves reflected by said reflector, in order to determine said refractive index by algebraic processes, said refractive index varying in a predetermined manner with said separation for a given dip of said reflector.

11. The method set forth in claim 10 including performing the aforesaid procedural steps at a different frequency from said particular frequency, determining the refractive index corresponding to said different frequency, and determining the dielectric constant and conductivity of said media by algebraic processes involving the predetermined values of said refractive index.

12. The method of determining the refractive index of the geologic media overlying the boundary of a buried oil accumulation or other similar electrical discontinuity that lies at a known depth, comprising propagating from a sending means electromagnetic waves of a particular frequency substantially at grazing incidence onto the air-earth interface substantially at the location of said sending means so that a part of the radiation from said sending means travels along said interface to receiving means spaced apart from said sending means and a part of said radiation is refracted into said earth onto said boundary and thence to said receiving means, measuring at said receiving means the variation in a selected parameter of the electromagnetic field resulting from the combined waves arriving at said receiving means, varying the spread between said sending means and said receiving means, by moving said receiving means along a traverse that passes over said boundary and is directed substantially toward said sending means, until the parameter values measured at said receiving means undergo anomalous variations indicative of a contact break and a delayed break, and measuring the delayed-break spread between said contact break and said delayed break, said delayed-break spread bearing a predetermined relation to said refractive index as expressed by the formula:

$$n = \sqrt{\left(\frac{d}{S_{db}}\right)^2 + 1}$$

where $n$ is the refractive index of the media overlying said boundary, $d$ is the depth of said boundary, and $S_{db}$ is said delayed-break spread.

13. The method set forth in claim 12 including performing the aforesaid procedural steps at a different frequency from said particular frequency, determining the refractive index corresponding to said different frequency, and determining the dielectric constant and conductivity of said media by algebraic processes involving the predetermined values of said refractive index.

14. The method of determining the optimum frequency for transmitting electromagnetic waves through geologic media and reflecting said waves from a subsurface reflector underlying said media, comprising propagating from a sending means electromagnetic waves of a particular frequency substantially at grazing incidence onto the air-earth interface substantially at the location of said sending means so that a part of the radiation from said sending means travels along said interface to receiving means spaced apart from said sending means and a part of said radiation is refracted into said earth onto said reflector and thence to said receiving means, measuring at said receiving means a quantity related to the amplitude of said waves, varying the spread between said sending means and said receiving means until said receiving means indicates an anomalous variation in said quantity indicative of the reception of waves reflected by said reflector, repeating the aforesaid procedural steps at frequencies that are different from said particular frequency, and determining at which frequency said quantity has its maximum value, said maximum value being indicative of said optimum frequency.

15. The method of locating the peripheral boundary of a subsurface mineral deposit, comprising propagating from a sending means electromagnetic waves substantially at grazing incidence onto the air-earth interface substantially at the location of said sending means so that a part of the radiation from said sending means travels along said interface to receiving means spaced apart from said sending means and a part of said radiation is refracted into said earth onto said deposit and thence to said receiving means, measuring at said receiving means the variation in a selected parameter of the electromagnetic field resulting from the combined waves arriving at said receiving means, varying the spread between said sending means and said receiving means along a traverse that crosses over the suspected location of said boundary until a delayed break in said variation indicates the presence of said boundary below and between said sending means and said receiving means, reversing the relative positions of said sending means and said receiving means with respect to said traverse and repeating each step of the forementioned procedure in a reverse direction along said traverse to obtain another delayed break in said variation confirming the presence of said boundary below and between said sending means and said receiving means.

16. The method as set forth in claim 15, wherein said spread is varied by moving said receiving means along said traverse, said boundary being located midway between the positions of said receiving means when said delayed breaks occur and at a depth approximating one-half their separation along said traverse.

17. The method as set forth in claim 15, wherein said spread is varied by moving said sending means along said traverse, said boundary being located midway between the positions of said sending means when said delayed breaks occur and at a depth approximating one-half their separation along said traverse.

18. The method as set forth in claim 15, wherein said spread is varied by moving both said sending means and said receiving means until said delayed breaks occur for the minimum separation between said sending means and said receiving means and the midpoint between said sending means and said receiving means lies at the same location when each of said delayed breaks occurs, said boundary being located substantially vertically below said midpoint and at a depth approximating one-half said minimum separation.

19. The method of locating the peripheral boundary of a subsurface mineral deposit the presence of which is known, comprising positioning a sending means over said deposit, propagating from said sending means electromagnetic waves substantially at grazing incidence onto the air-earth interface substantially at the location of said sending means so that a part of the radiation from said sending means travels along said interface to receiving means spaced apart from said sending means and a part of said radiation is refracted into said earth onto said deposit and thence to said receiving means, measuring at said receiving means the variation in a selected parameter of the electromagnetic field resulting from the combined waves arriving at said receiving means, varying the spread between said sending means and said receiving means along a traverse that crosses over said boundary until a departure from normal in said variation indicates that said boundary is located below and between said sending means and said receiving means.

20. The method of investigating a subsurface mineral deposit the presence of which is known, comprising positioning a sending means over said deposit, propagating from said sending means electromagnetic waves substantially at grazing incidence onto the air-earth interface substantially at the location of said sending means so that a part of the radiation from said sending means travels along said interface to receiving means spaced apart from said sending means and a part of said radiation is refracted into said earth onto said deposit and thence to said receiving means, measuring at said receiving means the variation in a selected parameter of the electromagnetic field resulting from the combined waves arriving at said receiving means, varying the spread between said sending means and said receiving means by moving said receiving means along a first traverse that commences inside the peripheral boundary of said deposit and continues until the presence of said boundary is indicated by a departure from normal in said variation which occurs substantially vertically above said boundary, and then varying the spread between said sending means and said receiving means by moving said receiving means along a second traverse outside said boundary and in alignment with said first traverse until another such departure from normal in said variation is indicated, wherein the separation between the departures is a measure of the depth of the boundary of said mineral deposit at a location substantially vertically below the first-mentioned departure.

21. The method of locating the peripheral boundary of an electrically anomalous medium lying beneath the surface of the earth, comprising propagating from a sending means electromagnetic waves substantially at grazing incidence onto the air-earth interface substantially at the location of said sending means so that a part of the radiation from said sending means travels along said interface to receiving means spaced apart from said sending means and a part of said radiation is refracted into said earth onto said medium and thence to said receiving means, measuring at said receiving means the variation in a selected parameter of the electromagnetic field resulting from the combined waves arriving at said receiving means, varying the spread between said sending means and said receiving means, by moving said receiving means along a traverse above said medium and oriented toward said sending means, until a first departure from normal in said variation occurs, continuing to vary the spread between said sending means and said receiving means until a second departure from normal in said variation is indicated, reversing the relative positions of said sending means and said receiving means with respect to said traverse and repeating each step of the forementioned procedure in a reverse direction along said traverse, wherein a repetition of said first departure and a transposition of said second departure to the opposite side of said first departure is indicative of the presence of said boundary substantially vertically below said first departure, and the separation along said traverse of said first departure and said second departure is a measure of the depth of said boundary.

22. The method of locating the peripheral boundary of a subsurface mineral deposit, comprising propagating from a sending means electromagnetic waves substantially at grazing incidence onto the air-earth interface substantially at the location of said sending means so that a part of the radiation from said sending means travels along said interface to multiple receiving means spaced apart along a traverse directed toward said sending means and overlying the suspected location of said boundary and a part of said radiation is refracted into said earth onto said deposit and thence to said receiving means, measuring at said receiving means a selected parameter of the electromagnetic field resulting from the combined waves arriving at said receiving means, varying the spread between said sending means and said receiving means by moving said sending means along said traverse until measurements at said receiving means disclose anomalous variations in said parameter indicative of a first contact break and a first delayed break, rotating the combination of said sending means and said receiving means through 180° about said contact break, and repeating each step of the forementioned procedure until measurements at said receiving means again disclose anomalous variations in said parameter indicative of a second contact break at substantially the same location along said traverse as said first contact break and a second delayed break located on the opposite side of said contact breaks from said first delayed break, wherein said contact breaks and said delayed breaks are indicative of the presence of said boundary substantially vertically below said contact breaks and the separation along said traverse of said contact breaks and either of said delayed breaks is a measure of the depth of said boundary.

References Cited in the file of this patent

UNITED STATES PATENTS

| | | |
|---|---|---|
| 1,349,104 | Rogers | Aug. 10, 1920 |
| 1,585,591 | Lowy | May 18, 1926 |
| 1,838,371 | Deardorf | Dec. 29, 1931 |
| 2,077,707 | Melton | Apr. 20, 1937 |
| 2,172,688 | Barret | Sept. 12, 1939 |
| 2,192,404 | Jakosky | Mar. 5, 1940 |
| 2,211,125 | Jakosky | Aug. 13, 1940 |
| 2,426,918 | Barret | Sept. 2, 1947 |
| 2,585,907 | Barret | Feb. 19, 1952 |
| 2,661,466 | Barret | Dec. 1, 1953 |

FOREIGN PATENTS

| | | |
|---|---|---|
| 322,040 | Germany | June 19, 1920 |

OTHER REFERENCES

"Geophysical Exploration," Heiland, pp. 815–818, © 1940, Prentice-Hall, Inc., N. Y.